(12) United States Patent
Guyton

(10) Patent No.: US 8,221,043 B2
(45) Date of Patent: Jul. 17, 2012

(54) RELEASABLE FASTENER SYSTEMS AND METHODS

(75) Inventor: Jason D. Guyton, Valencia, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 816 days.

(21) Appl. No.: 12/032,992

(22) Filed: Feb. 18, 2008

(65) Prior Publication Data

US 2009/0208307 A1 Aug. 20, 2009

(51) Int. Cl.
*E01B 9/12* (2006.01)

(52) U.S. Cl. ......... 411/511; 411/82; 411/82.5; 411/432; 411/512

(58) Field of Classification Search ............ 411/82, 411/90, 379, 508, 509, 511, 512, 513, 514, 411/517, 518, 522, 913, 82.5, 390–391, 432–433, 411/DIG. 2; 24/297, 453
See application file for complete search history.

(56) References Cited

U.S. PATENT DOCUMENTS

| | | | | |
|---|---|---|---|---|
| 2,138,176 A * | 11/1938 | Keys | ............................. | 248/613 |
| 2,203,397 A * | 6/1940 | Taylor | ........................... | 411/529 |
| 2,639,179 A * | 5/1953 | Phelps | .......................... | 292/251 |
| 2,943,373 A * | 7/1960 | Rapata | ............................ | 24/662 |
| 3,205,759 A * | 9/1965 | Texier | ............................. | 411/44 |
| 3,235,297 A * | 2/1966 | Fernberg | ....................... | 403/164 |
| 3,406,431 A * | 10/1968 | Armstrong et al. | ............. | 24/607 |
| 3,473,283 A * | 10/1969 | Meyer | ........................ | 52/718.05 |
| 3,725,835 A * | 4/1973 | Hopkins et al. | ................ | 337/140 |
| 3,796,464 A * | 3/1974 | Hansen et al. | ................. | 299/104 |
| 3,808,648 A | 5/1974 | Billarant et al. | | |
| 4,096,993 A * | 6/1978 | Behr | ............................ | 236/68 B |
| 4,501,521 A * | 2/1985 | Geczy | ............................ | 411/217 |
| 4,624,585 A * | 11/1986 | Nix et al. | ........................ | 384/296 |
| 4,739,912 A * | 4/1988 | Klawieter et al. | ................ | 223/85 |
| 4,898,398 A * | 2/1990 | Cassel | ........................ | 280/87.042 |
| 5,094,579 A * | 3/1992 | Johnson | ........................ | 411/107 |
| 5,160,233 A * | 11/1992 | McKinnis | ...................... | 411/433 |
| 5,211,537 A * | 5/1993 | Langston et al. | .......... | 415/209.2 |
| 5,248,233 A * | 9/1993 | Webster | ......................... | 411/433 |
| 5,366,331 A * | 11/1994 | Erbes | ............................ | 411/433 |
| 5,593,264 A * | 1/1997 | Schlegel et al. | ................ | 411/522 |
| 5,704,100 A * | 1/1998 | Swan | .............................. | 24/656 |
| 5,722,709 A * | 3/1998 | Lortz et al. | .................... | 294/86.4 |
| 5,810,535 A * | 9/1998 | Fleckenstein et al. | ......... | 411/522 |
| 5,928,395 A * | 7/1999 | Glen et al. | ....................... | 55/378 |
| 6,388,043 B1 | 5/2002 | Langer et al. | | |
| 6,450,725 B1 * | 9/2002 | Roth et al. | ....................... | 403/28 |
| 6,712,574 B1 * | 3/2004 | Roopnarine | .................. | 411/433 |
| 6,860,689 B1 * | 3/2005 | Attanasio | ...................... | 411/353 |
| 6,910,841 B2 * | 6/2005 | Isenberg | ........................ | 411/386 |
| 7,753,632 B2 * | 7/2010 | Naitou et al. | .................. | 411/511 |
| 2001/0026687 A1 * | 10/2001 | Kosaka et al. | ................ | 396/452 |

(Continued)

*Primary Examiner* — Victor Batson
*Assistant Examiner* — Roberta Delisle
(74) *Attorney, Agent, or Firm* — McDermott Will & Emery LLP

(57) ABSTRACT

In some embodiments, a fastening system includes two opposing plates, and a retainer material that is activated to increase the flexibility of the retainer material. The retainer material surrounds at least a portion of two opposing plates, the plates and the retainer material mounted to allow the plates to move apart and back together when the retainer material is flexible. A pin is insertable through an opening between the plates. The pin includes a first tapered portion configured to separate the plates as the pin is inserted in the opening via a pushing force. The retainer material becomes rigid when deactivated to lock the pin between the plates.

20 Claims, 5 Drawing Sheets

U.S. PATENT DOCUMENTS

| | | |
|---|---|---|
| 2004/0074069 A1 | 4/2004 | Browne et al. |
| 2004/0117955 A1 | 6/2004 | Barvosa-Carter et al. |
| 2006/0039776 A1* | 2/2006 | Schutz .......................... 411/432 |
| 2009/0290954 A1* | 11/2009 | Dietz et al. .................... 411/386 |

* cited by examiner

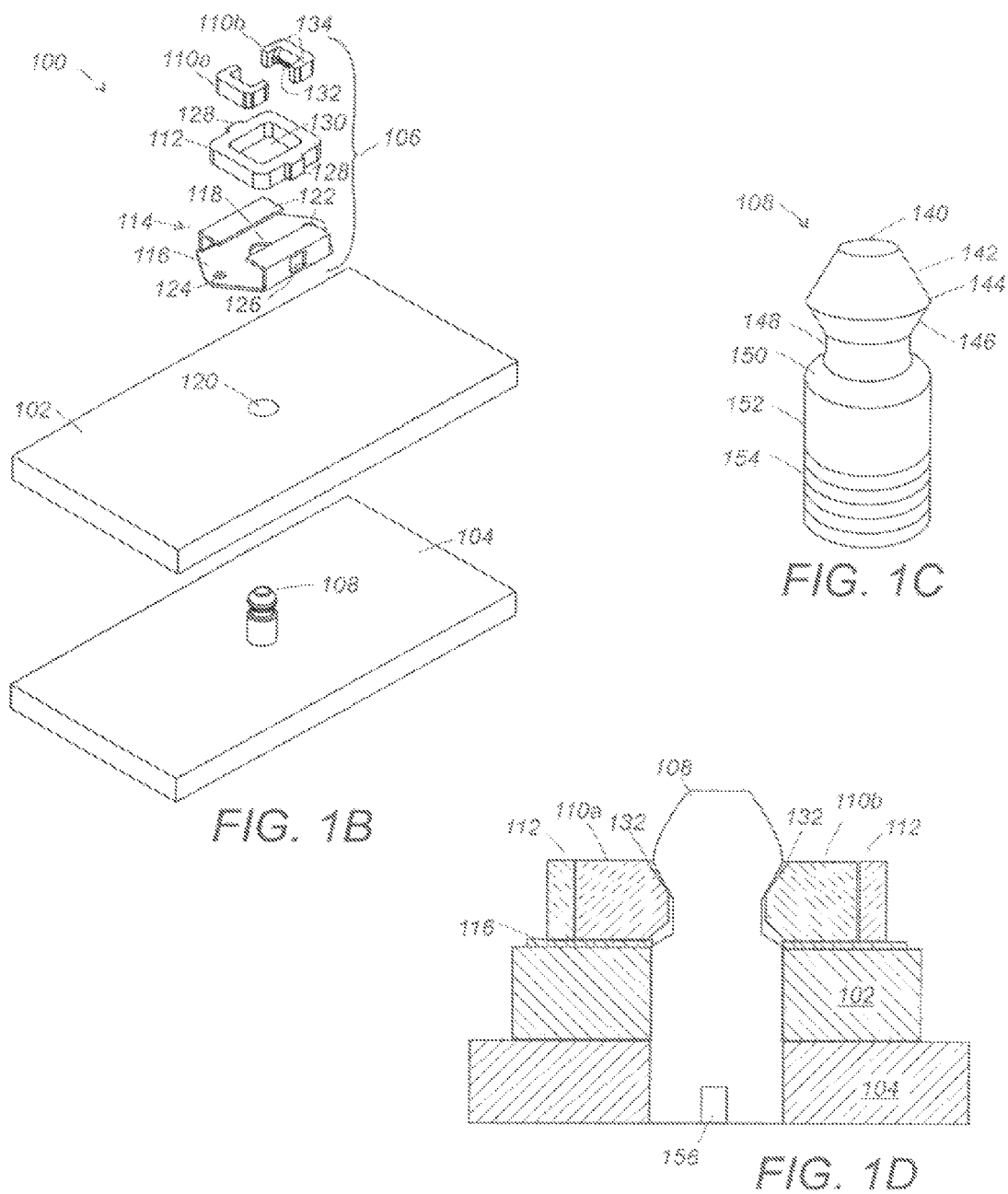

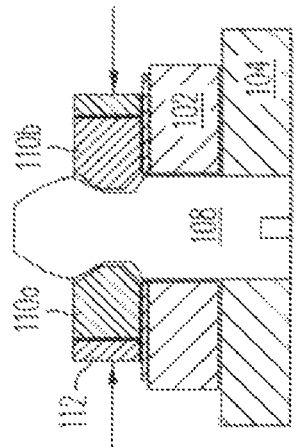
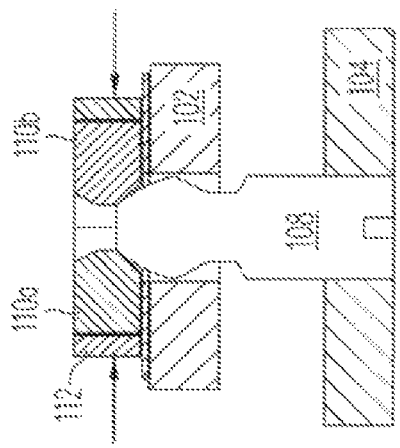
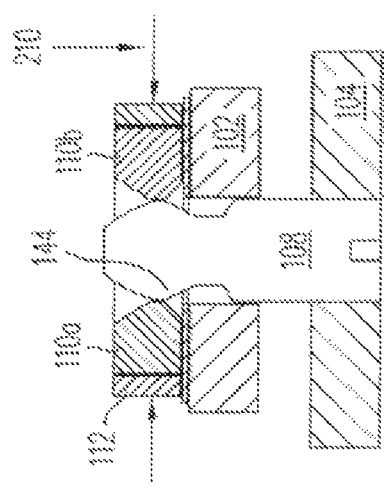
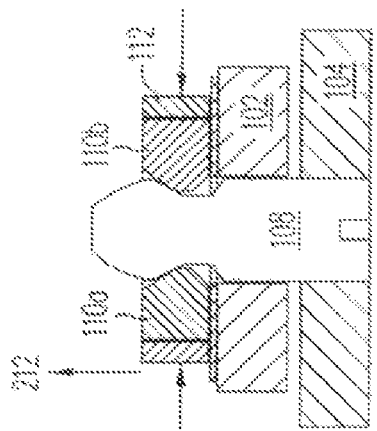
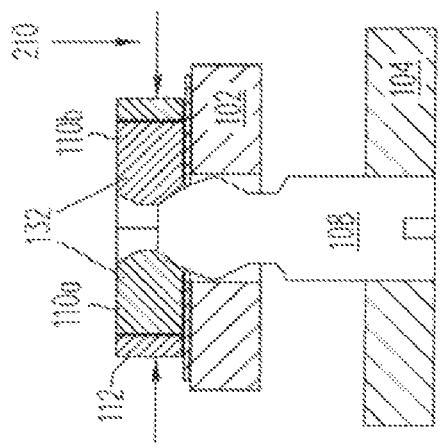
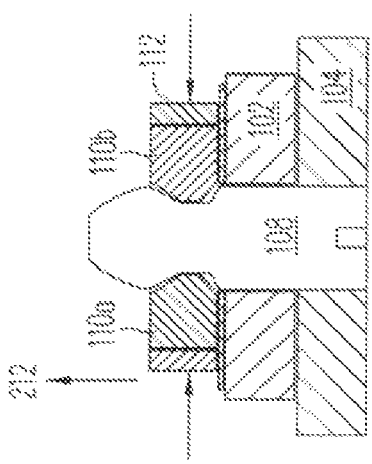

RELEASABLE FASTENER SYSTEMS AND METHODS

BACKGROUND

Various types of fasteners such as bolts, screws, rivets, and mechanical/electro-mechanical latches, among others, can be used to attach two or more members together. Occasionally, the fasteners must be removed to open, repair, change the configuration of the members, or for some other reason. There are often situations where access to traditional fasteners may be restricted. In other situations, a member may need to be removed and replaced quickly. In still other situations, accessing the head of a traditional fastener is likely to cause damage to surface coatings that would need to be repaired. Further still, some types of fasteners such as rivets, cannot be removed without destroying the fastener.

A fastener such as a bolt, screw, or rivet may require a screwdriver, wrench or other tool for removal. In some situations, the necessary tools may not be available at the time and location when removal of the fastener becomes necessary. The requirement for tools may cause unwanted delay.

A greater tightening force may be applied in order to create a more robust attachment between the attached members. An attachment created using greater force may allow less vibration between the attached members. An attachment created using greater force may also provide increased reliability. However, a commensurate force may then be required to remove the bolt, screw or rivet. Applying a greater force required to loosen such an attachment may require tools, equipment or personnel not immediately available, thus causing unwanted delay.

Similarly, over time the bolt, screw or rivet may become more difficult to remove. The increased difficulty of removal may be due to stress, distortion, fatigue, vibration or other similar causes. In the case of a fastening device that has become more difficult to remove, more force may be necessary to remove the fastening device than was used to install the fastening device. Again, the increased time required to remove a fastener may result in unnecessary delay.

Threaded fasteners such as bolts, nuts or screws may be susceptible to corrosion. In such a case special tools may be necessary to remove or release the fastener. Again, such special tools may not be immediately available at the time and location necessary to remove the fastener. Even when the special tools are immediately available, using such tools may cause unwanted delay.

SUMMARY

Embodiments of fastening systems and methods are disclosed. In some embodiments, a fastening system includes two opposing plates, and a retainer material that is activated to increase the flexibility of the retainer material. The retainer material surrounds at least a portion of two opposing plates, the plates and the retainer material mounted to allow the plates to move apart and back together when the retainer material is flexible. A pin is insertable through an opening between the plates, the pin includes a first tapered portion configured to separate the plates as the pin is inserted in the opening via a pushing force. The retainer material becoming rigid when deactivated to lock the pin between the plates.

In other embodiments, a fastening system includes a pin and a retainer portion. The pin includes a flared portion extending from a tip of the pin to an intermediate portion of the pin, and a tapered portion opposite the flared portion of the pin. The retainer portion includes retainer material and a first plate movable to engage the pin proximate the tapered portion. The retainer material may be configured to engage the first plate. The material may become elastic when activated to allow the first plate to move between engaged and disengaged positions. When the retainer material is not activated it may be rigid and thus retain the first plate in the engaged position.

BRIEF DESCRIPTION OF THE FIGURES

FIG. 1B shows an exploded perspective view of the embodiment of the fastening system in FIG. 1A.

FIG. 1C shows an embodiment of a pin that can be utilized in the fastening system of FIG. 1A.

FIG. 1D shows a side cross-sectional view of the fastening system of FIG. 1A.

FIGS. 2B-2G show cross-sectional views of an embodiment of a fastening system during various stages of operation in accordance with the present invention.

DETAILED DESCRIPTION OF THE FIGURES

Figure 1A:
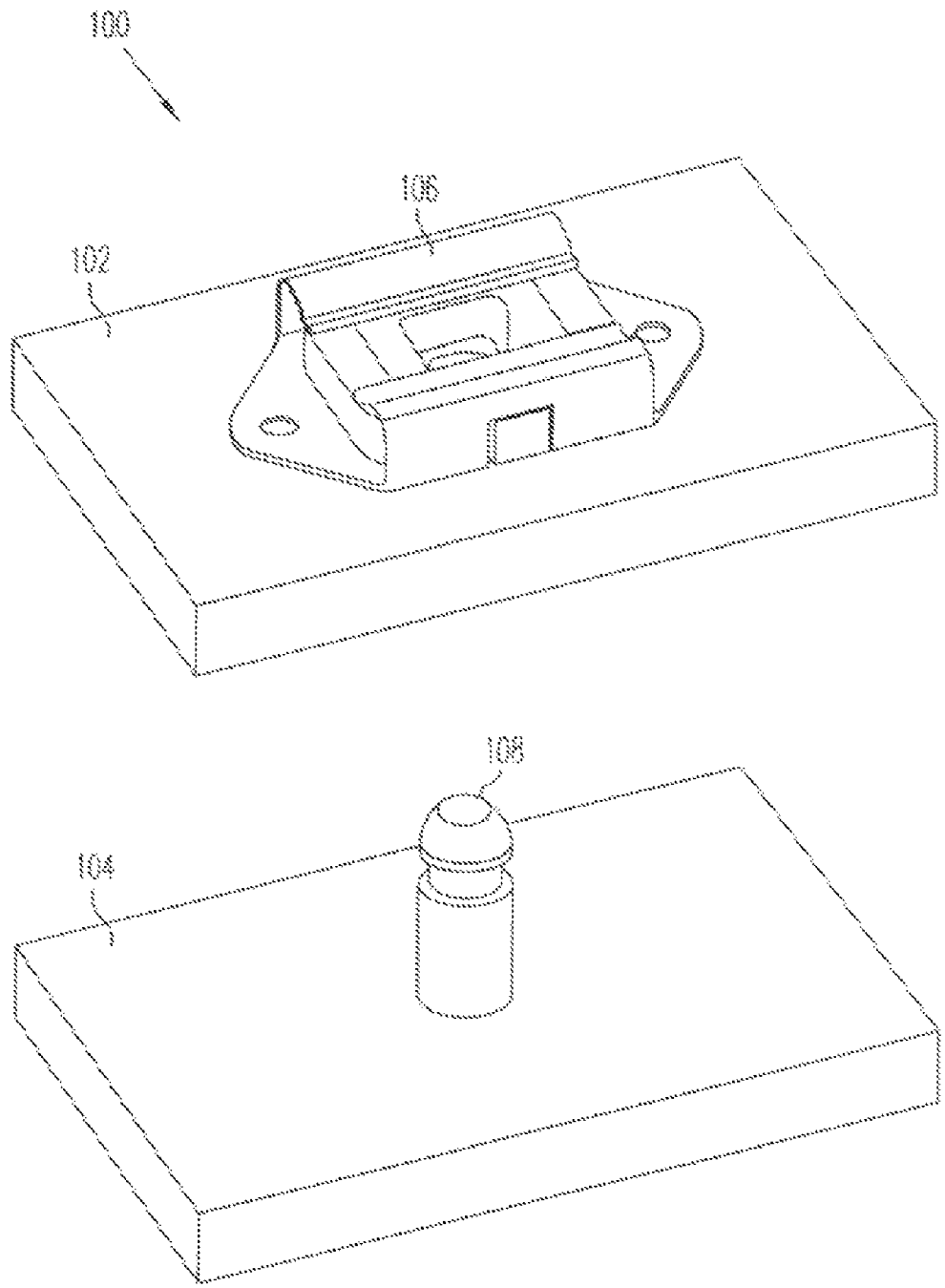
FIG. 1A shows a perspective view of a fastening system in accordance with some embodiments of the invention.

FIG. 1 shows an exploded, or isometric, view of an embodiment of fastening system 100 capable of joining two members 102, 104 in accordance with the present invention. Fastening system 100 may be used in a variety of applications, such as where access to traditional fasteners and panels may be restricted, where members need to be removed and replaced quickly, where fasteners may be subject to corrosion, and/or where installation or removal of traditional fasteners may damage a surface. To fasten members 102, 104 together, fastening system 100 includes a retainer portion 106 on first member 102 that engages a pin 108 on second member 104. Retainer portion 106 operates in an unlocked state and a locked state. In the unlocked state, pin 108 may be inserted and removed at will from retainer portion 106. In the locked state, pin 108 is held firmly in retainer portion 106. Retainer portion 106 includes two movable plates 110a, 110b (collectively "plates 110"); retainer material 112; and bracket 114. Movable plates 110 can be inserted in retainer material 112, and retainer material 112 can be inserted in bracket 114.

In the embodiment shown, bracket 114 includes a faceplate 116 with an opening 118 that is positioned over an opening 120 in member 102. Pin 108 is inserted in retainer portion 106 through opening 118. Bracket 114 can be attached to member 102 using one or more suitable fastening methods such as adhesive, rivets, and welding, among others. Bracket 114 can further include one or more collars 122 to hold retainer material 112 and movable plates 110 in bracket 114. As shown, L-shaped collars 122 are positioned on respective opposing side edges of faceplate 116, thus forming a U-shaped channel on either side of bracket 114. Other suitable configurations of collars 122 or other device(s) for holding retainer material 112 and movable plates 110 in bracket 114 can be used. Faceplate 116 can include one or more elongated edges with openings 124 to allow bracket 114 to be attached to or removed from member 102 using rivets (not shown) or other fasteners even when retainer material 112 is inserted in bracket 114. Retainer material 112 may be more securely held in bracket 114 by including one or more openings 126 or detents (not shown) in bracket 114 to receive one or more corresponding protrusions on retainer material 112 such as tabs 128 when retainer material 112 is inserted in bracket 114.

Retainer material 112 is configured to encompass a sufficient portion of movable plates 110 to retain movable plates 110 when movable plates 110 move toward or away from one another as pin 108 is removed or inserted. In the embodiment shown, retainer material 112 is a square ring of shape memory polymer or other suitable material with an opening 130 into which movable plates 110 can be positioned. Tabs 128 are included on opposing outer sides of retainer material 112 that correspond to openings 126 in bracket 114.

In the embodiment shown, movable plates 110 have a U-shape that is sized to fit within approximately one-half the perimeter of hollow core 130 in retainer material 112. Movable plates 110 and retainer material 112 can have approximately the same thickness. Movable plates 110 can further include wedge 132 between legs 134 of the U-shape, with the smallest cross-section of wedge 132 facing the open portion of the U-shape. The ends of the U-shaped movable plates 110 face one another when movable plates 110 are positioned within retainer material 112 and move away from and toward one another as pin 108 is inserted and removed from retainer portion 106.

FIG. 1C shows an embodiment of pin 108 that includes a flared portion 142 extending from a tip 140 of pin 108 to intermediate portion 144. Tip 140 is shown with a flat top but may be more (or less) pointed than the embodiment of pin 108 shown. Tapered portion 146 is adjacent the flared portion 142 of the pin and extends from intermediate portion 144 of the pin to a detent portion 148 of the pin. Pin 108 may also include a base portion 152 proximate the detent portion 148 to enable the pin to be inserted or otherwise attached to member 104 as shown in FIG. 1A. In the example shown, base portion 152 includes a threaded portion 154 to allow the pin to be screwed into a threaded portion of member 104.

Flared portion 142 of pin 108 can be configured to exert a gradually increasing separation force between movable plates 110 as pin 108 is inserted in retainer portion 106. Pin 108 also includes detent portion 148. Tapered portion 146 is configured to exert separation force on movable plates 110 as pin 108 is removed from the retainer portion 106. The force causes movable plates 110 to disengage from pin 108. As discussed further herein, removal of pin 108 from retainer portion 106 typically requires activation of retainer material 112.

Base portion 152 is typically larger in circumference or periphery than detent portion 148. A flat or slightly tapered shoulder 150 can be included between detent portion 148 and base portion 152 to provide reduce contact area between pin 108 and retainer portion 106 and allow any load pushing up on member 104 to be resisted by the contact between member 104 and member 102. The length of detent portion 148 and base portion 152 can be selected so that members 102, 104 are coupled with the desired amount of movement allowed between members 102, 104. In some embodiments, retainer material 112 forces plates 110 as tight as possible to tapered portion 146 of pin 108. Along with the vertical adjustment of pin 108, as installed in member 104, the configuration of pin 108 and plates 110 can be selected such that only tapered portion 146 of pin 108 contacts wedges 132 of plates 110.

Upon installation of pin 108 into member 104, the height of pin 108 can be adjusted using a tool interfacing with socket 156, which can be a Phillips, Torx, or other suitable tool socket type. The height of pin 108 can be adjusted to match the corresponding installed retainer 106 and then locked in place using Lok-Tite or similar substance, or using a jam nut (not shown) located and recessed into either of the mating surfaces between members 104 and 102.

Pin 108 is shown with a round cross-section, however pin 108 can have other cross-sectional shapes. For example, pin 108 can have a square, rectangular, oval, or other suitable shape. Wedges 132 in movable plates 110 can have a curved portion with a radius suitable to engage some or all of the circumference of detent portion 148 of pin 108. Detent portion 148 can have other configurations selected to be compatible with the external shape of pin 108.

Referring to FIGS. 1C and 1D, FIG. 1D shows a side cross-sectional view of pin 108 embedded in member 104. Pin 108 is engaged between wedges 132 of movable plates 110 to couple member 102 to member 104. As shown, the outer surface of wedge 132 can be faceted, rounded, and/or otherwise shaped to conform approximately to the shape of tapered portion 146 of pin 108. The dimensions of detent portion 148, the angles of tapered portion 146 and flared portion 142 on pin 108, and wedge 132 can be selected based on expected operational conditions such as the amount and direction(s) of load to be placed on members 102, 104.

In some embodiments, retainer material 112 can be made pliable in an activated state and rigid in a deactivated state. One example of retainer material 112 is shape memory polymer (SMP) that softens or hardens on demand. SMP materials maintain full structural rigidity up to a specifically designed activation temperature and soften when the temperature rises above the activation temperature. The temperature of the SMP material may be varied using electrical current applied to a resistive heating element embedding within the material. Although heat is the current method of activation for the SMP material, other activation methods such as light, magnetic fields, etc. are anticipated. In some embodiments, retainer material 112 can be fabricated by impregnating a flexible fabric with a shape memory polymer and molded or cut to the desired shape. Other variable modulus materials can be used for retainer material 112. For example, elastic materials such as rubber and other polymer materials can be used as retainer material 112. The elasticity/rigidity properties and dimensions of retainer material 112 can be selected based on expected operational conditions such as the amount and direction(s) of load to be placed on members 102 and 104.

Figure 2A:
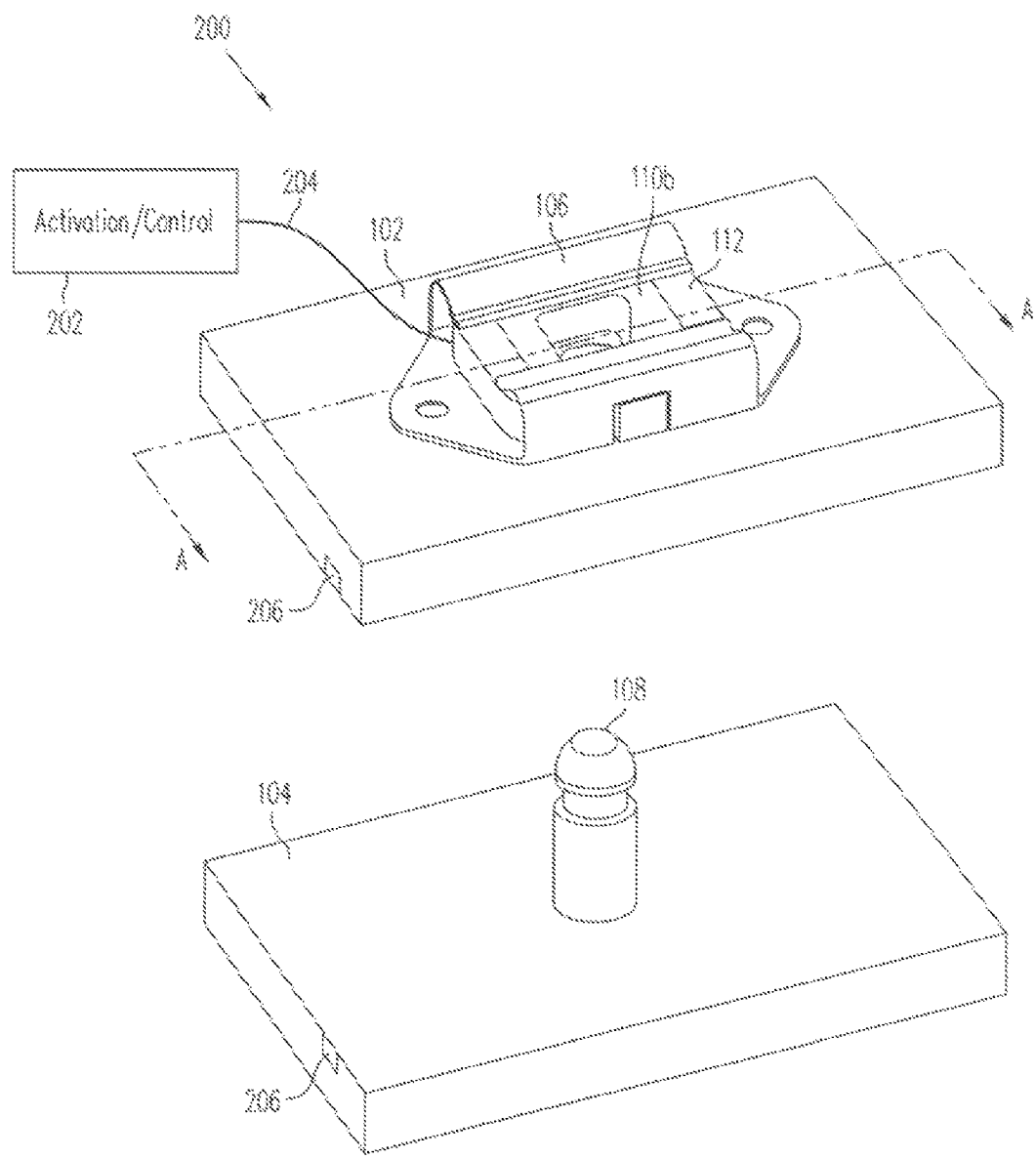
FIG. 2A shows another embodiment of a fastening system with an activation/control unit.

FIG. 2A shows another embodiment of fastening system 200 with an activation/control unit 202 coupled to retainer material 112 via conduit 204. Conduit 204 is configured to deliver an activator such as electric current, magnetic current, gas, liquid, light, or chemical to retainer material 112. Conduit 204 can be coupled to one or more locations on retainer material 112 and coupled to multiple instances of the fastening system 100. Retainer material 112 can further include substances to help conduct or distribute an activating mechanism over retainer material 112. For example, retainer material 112 can include substances that conduct heat from an activator such as electric or magnetic fields, liquid, gas, or other activator. Further, bracket 114, movable plates 110, and/or pin 108 can be fabricated with materials that do not conduct activators such as electric current. Activation/control unit 202 can be remotely located and operated manually via electrical, optical, or mechanical switches.

Activation/control unit 202 can also be coupled to a microprocessor system (not shown) that is programmed with logic instructions stored on computer readable medium such as a storage or memory device. The logic instructions can be configured to activate and deactivate retainer material 112 based on instructions input by an operator, or by internally generated command signals based on operational conditions. For example, activation/control unit 202 can be configured with logic instructions to receive input from one or more sensor devices and automatically activate or deactivate retainer material 112 based on operating conditions. Activation/control unit 202 can also include logic instructions to receive input from inductive, optical, magnetic, or other suitable proximity sensors 206 on members 102, 104, (or bracket 114 and pin 108), and send an alert if members 102, 104 are separated when sensed operating conditions indicate that members 102, 104 should be attached.

FIGS. 2B-2G show cross-sectional views of fastening system 200 (FIG. 2A) during various stages of operation. FIG. 2B shows a cross-sectional view of member 102 being coupled to member 104 by a force 210 pushing member 102 toward member 104 with pin 108 inserted in an opening in member 102. In some embodiments, retainer material 112 is activated to become pliable or elastic. In other embodiments, retainer material 112 is made from a substance that is elastic without activation. The top of pin 108 is adjacent the bottom of wedges 132 of movable plates 110. Retainer material 112 is positioned on the outer sides of movable plates 110 to keep movable plates 110 together until tapered portion 146 (FIG. 1C) of pin 108 gradually separates wedges 132 as member 102 is pushed closer to member 104.

FIG. 2C shows movable plates 110 separated at intermediate portion 144 of pin 108. Retainer material 112 continues to apply a force to pull movable plates 110 together. As member 102 gets closer to member 104, movable plates 110 slide along the contour of pin 108 until member 102 meets member 104 and wedges 132 of movable members 110 are engaged in detent portion 148 (FIG. 1C) of pin 108, as shown in FIG. 2D. In some embodiments, retainer material 112 can be deactivated and return to rigid state once members 102, 104 are coupled. Thus, fastening system 100 (FIG. 1A) does not require power to stay locked.

FIGS. 2E-2G show cross-sectional views of fastening system 200 (FIG. 2A) as member 102 is decoupled from member 104. FIG. 2E shows a cross-sectional view of a separation force 212 being applied to push member 102 away from member 104. Wedges 132 of movable plates 110 are engaged in detent portion 148 of pin 108. Retainer material 112 is positioned on the outer sides of movable plates 110 to keep movable plates 110 together until tapered portion 146 (FIG. 1C) of pin 108 gradually separates wedges 132 as member 102 is pulled away from member 104. In some embodiments, retainer material 112 is activated to become pliable or elastic. In other embodiments, retainer material 112 is made from a substance that is elastic without activation.

FIG. 2F shows movable plates 110 separated at intermediate portion 144 of pin 108. Retainer material 112 continues to apply a force to pull movable plates 110 together. As member 102 gets further from member 104, movable plates 110 slide along the contour of pin 108 and wedges 132 of movable members 110 disengage from detent portion 148 (FIG. 1C) of pin 108, as shown in FIG. 2G. In some embodiments, retainer material 112 can be deactivated and return to rigid state once members 102, 104 are decoupled.

Figure 3B:
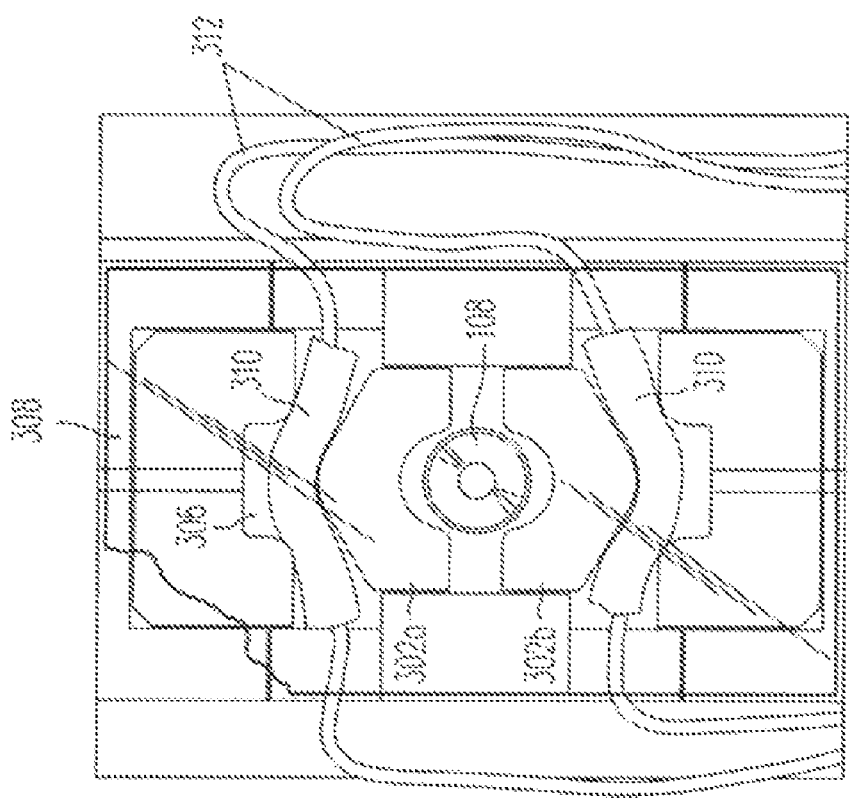
FIGS. 3A and 3B show top views of an embodiment of another embodiment of a fastening system in the closed and open positions in accordance with the present invention.
Figure 3A:
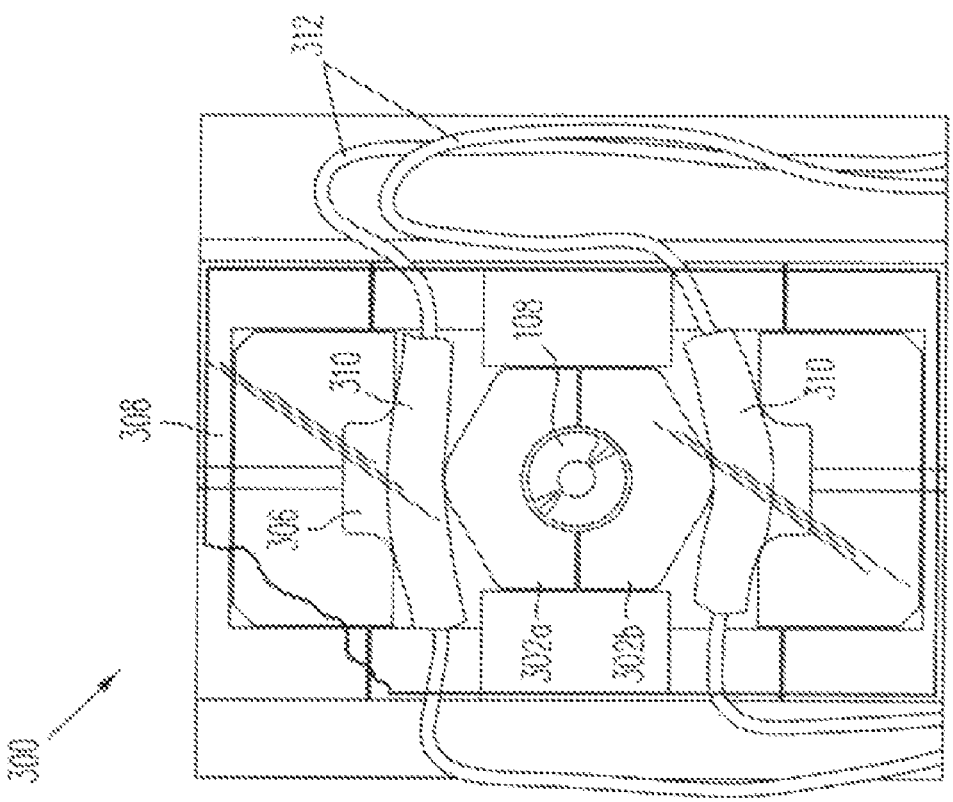

FIGS. 3A and 3B show a top view of another embodiment of a fastening system 300 that includes movable plates 302 positioned in a channel 306 in bracket 308. Bracket 308 is coupled to a first member and movable plates 302 engage a detent portion of pin 108 on second member to couple the first and second members together. Each movable plate 302 has three outer sides, and a semi-circular inner periphery. The outer perimeter of movable plates 302 form a hexagonal shape with a circular opening in the center when movable plates 302 are positioned facing one another. A length of retainer material 310 is positioned at each end of movable plates 302. Retainer material 310 is configured to encompass a sufficient portion of movable plates 302 to retain movable plates 302 when movable plates 302 move toward or away from one another as pin 108 is removed or inserted. Electrically-activated heating elements 312 are coupled to retainer material 310 to enable fastening system 300 to operate between an unlocked state and a locked state. In the unlocked state, pin 108 may be inserted and removed at will from movable plates 302. In the locked state, pin 108 is held firmly between the center of movable plates 302.

FIG. 3A shows pin 108 fully inserted between movable plates 302 and retainer material 310 in a deactivated or locked state to prevent movement of plates 302. FIG. 3B shows pin 108 being removed from between movable plates 302 while retainer material 310 is in an activated or open state. Movable plates 302 separate from one another according to the contours of pin 108. Retainer material 310 deflects as movable plates 302 move away from one another. Retainer material 310 returns to the undeflected configuration once pin 108 is removed from between movable plates 302. Retainer material 112, 310 can be activated and deactivated multiple times to allow repeated insertion and removal of the pin 108.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. For example, some embodiments may include one movable plate while the surface opposite the plate remains stationary. The functionality and combinations of functionality of the individual modules can be any appropriate functionality. Additionally, limitations set forth in publications incorporated by reference herein are not intended to limit the scope of the claims. In the claims, unless otherwise indicated the article "a" is to refer to "one or more than one". Additionally, as used in the claims or the specification "coupled" may be interpreted to mean "connected" and/or "joined". Similarly, "activated" may be interpreted to mean "energized."

I claim:

1. A fastening system, comprising:
    a pin including:
        a flared portion from a tip of the pin to an intermediate portion of the pin, and a tapered portion opposite the flared portion of the pin;
    a retainer portion including:
        a first plate movable to engage the pin proximate the tapered portion; and
        retainer material configured adjacent at least a portion of the first plate, the material being further configured to become elastic and to increase in flexibility when activated to allow the first plate to move from a disengaged position to an engaged position, and upon removal of the activation, to become rigid and to increase in rigidity to retain the first plate in the engaged position;
    wherein the activation comprises application of an electrical current to the retainer material to heat the retainer material;
    wherein the disengaged position comprises no contact between the pin and the first plate; and
    wherein the engaged position comprises contact between the pin and the first plate.

2. The fastening system of claim 1 the pin further comprising:
   a flared portion configured to move the plate as the pin is inserted in the retainer portion.

3. The fastening system of claim 1 the pin further comprising:
   a tapered portion configured to move the plate as the pin is removed from the retainer portion.

4. The fastening system of claim 1, the pin further comprising:
   a detent proximate the tapered portion of the pin.

5. The fastening system of claim 4, the pin further comprising:
   a base proximate the detent; and
   a threaded portion proximate the base to allow the pin to be attached to a supporting member.

6. The fastening system of claim 5 the pin further comprising:
   a wedge in the first plate, the first tapered portion of the pin contacting the wedge of the first plate when the pin is engaged in the retaining member.

7. The fastening system of claim 1, the retainer portion further comprising:
   a second plate movable to engage another portion of the pin proximate the tapered portion; and
   the retainer material configured adjacent at least a portion of the second plate, the material being further configured to become elastic when activated to allow the second plate to move between engaged and disengaged positions, and to become rigid to retain the second plate in the engaged position when not activated.

8. The fastening system of claim 1, the retainer material is an electrically-activated shape memory polymer.

9. The fastening system of claim 1, the retainer portion further comprising:
   a bracket configured to enclose and retain at least a portion of two sides of the first plate and at least a portion of the retainer material while allowing the first plate and the retainer material to move, the bracket is further configured for attachment to a support member.

10. The fastening system of claim 7, the retainer portion further comprising:
    a bracket configured with side members to enclose and retain at least a portion of two opposing sides of the first and second plates and at least a portion of the retainer material while allowing the first and second plates and the retainer material to move, the bracket is further configured with tabs that enable the bracket to be attached to a support member.

11. The fastening system of claim 7, further comprising:
    retainer material configured as a continuous ring that surrounds at least three sides of each of the first and second plates; and
    a wedge in the first and second plates, the tapered portion of the pin contacting the wedges when the pin is engaged in the retainer portion.

12. A fastening system comprising:
    two opposing movable plates, the plates including a wedge;
    a retainer material that is activatable to increase the flexibility of the retainer material, the retainer material surrounds at least a portion of two opposing plates, the plates and the retainer material mounted to allow the plates to move apart and back together when the retainer material is flexible; and
    a pin insertable through an opening between the plates, the pin includes a first tapered portion configured to separate the plates as the pin is inserted in the opening via a pushing force, the first tapered portion of the pin contacting only the wedge of the movable plates;
    wherein the retainer material is activatable to move the opposing plates from a disengaged position to an engaged position, and upon removal of the activation, to become rigid and to increase in rigidity to retain the plates in the engaged position;
    wherein the activation comprises application of an electrical current to the retainer material to heat the retainer material;
    wherein the disengaged position comprises no contact between the pin and the plates; and
    wherein the engaged position comprises contact between the pin and the plates.

13. The fastening system of claim 12, further comprising the retainer material is a shape memory polymer.

14. The fastening system of claim 12, further comprising the pin including a reverse tapered portion proximate the first tapered portion, the reverse tapered portion being configured to separate the plates as the pin is removed via a pulling force.

15. The fastening system of claim 12, further comprising the pin including a detent portion proximate the reverse tapered portion, and the detent portion is retained in the opening between the plates when the plates move back together.

16. The fastening system of claim 1, further comprising:
    a conduit;
    an activation unit coupled to the retainer material via the conduit, the conduit is configured to deliver an activator including at least one of the group consisting of:
    electric current, magnetic current, heat, cold, gas, liquid, light, and a chemical to the retainer material.

17. The fastening system of claim 1, further comprising:
    an activation unit including logic instructions to receive input from a proximity sensor, and to send an alert if the first plate is in the disengaged position when sensed operating conditions indicate that the first plate should be in the engaged position.

18. The fastening system of claim 12, further comprising:
    a conduit;
    an activation unit coupled to the retainer material via the conduit, the conduit is configured to deliver an activator including at least one of the group consisting of:
    electric current, magnetic current, heat, cold, gas, liquid, light, and a chemical to the retainer material.

19. The fastening system of claim 12, further comprising:
    an activation unit including logic instructions to receive input from a proximity sensor, and to send an alert if the plates are in the disengaged position when sensed operating conditions indicate that the plates should be in the engaged position.

20. The fastening system of claim 12, further comprising:
    the first tapered portion of the pin contact only a smallest cross-section of the wedge of the movable plates and the plates retain the pin when the plates are in the engaged position.

* * * * *